United States Patent [19]

Bayard

[11] Patent Number: 5,026,672

[45] Date of Patent: Jun. 25, 1991

[54] METHOD OF FABRICATING A SINTERED BODY CONTAINING TIN OXIDE

[75] Inventor: Michel L. Bayard, Portland, Oreg.

[73] Assignee: Tektronix, Inc., Beaverton, Oreg.

[21] Appl. No.: 542,603

[22] Filed: Jun. 25, 1990

[51] Int. Cl.$^5$ .............. C04B 35/02; C04B 35/46; C04B 35/48; C01B 9/00

[52] U.S. Cl. ...................... 501/134; 501/94; 501/100; 501/127; 501/128; 501/133; 423/491; 423/494

[58] Field of Search ............. 501/94, 100, 127, 128, 501/133, 134; 423/491, 494

[56] References Cited

U.S. PATENT DOCUMENTS

| | | | |
|---|---|---|---|
| 4,785,375 | 11/1988 | Campbell | 361/321 |
| 4,789,653 | 12/1988 | Ogata et al. | 501/134 |
| 4,960,739 | 10/1990 | Kageyama | 501/137 |

FOREIGN PATENT DOCUMENTS

| | | | |
|---|---|---|---|
| 0018505 | 2/1975 | Japan | 501/134 |
| 0017699 | 2/1977 | Japan | 501/134 |
| 0067900 | 6/1978 | Japan | 501/134 |
| 0284670 | 11/1970 | U.S.S.R. | 501/134 |

*Primary Examiner*—William R. Dixon, Jr.
*Assistant Examiner*—Michael Marcheschi
*Attorney, Agent, or Firm*—John D. Winkelman; John Smith-Hill

[57] ABSTRACT

A sintered body of tin oxide is made by forming a finely divided mixture containing at least about 0.2 weight percent ZnO, at least about 0.2 weight percent SiO$_2$, up to about 0.5 weight percent Al$_2$O$_3$, balance pure SnO$_2$, with the sum of the proportions of ZnO and SiO$_2$ being less than about 2 weight percent. The mixture is compacted and heated to a sintering temperature. The tin oxide may be doped with antimony.

9 Claims, No Drawings

METHOD OF FABRICATING A SINTERED BODY CONTAINING TIN OXIDE

BACKGROUND OF THE INVENTION

This invention relates to a method of fabricating a sintered body containing tin oxide.

A film of pure tin oxide is electrically conductive and transparent and therefore finds wide application where these properties are required, for example as electrodes in liquid crystal displays and as optical coatings.

A film of tin oxide is conventionally deposited by sputtering from a target that comprises a sintered body of tin oxide. In order to avoid large, sharp spatial variations in the thickness of the film it is necessary that the ceramic target be of uniform density. It is desirable that the sputtering target be of high density in order for it to be cohesive and have a reasonable operational life.

A ceramic body of tin oxide having a density up to about 90% theoretical density can be made by hot isostatic pressing. However, it has been found that hot isostatic pressing sometimes leads to a target of non-uniform composition even though the ingredients have been thoroughly mixed before the pressing takes place.

When granular material is sintered, material diffuses across the grain boundaries with the result that contacting grains are drawn together and merge. It is known to use a sintering agent to promote the sintering operation. A sintering agent is liquid at the sintering temperature. The liquid sintering agent enters the space between grains and promotes diffusion across the grain boundaries. When the grains merge and are bonded together, the sintering agent is displaced.

A difficulty associated with sputtering a tin oxide film from a target of sintered tin oxide is that the resulting film might be colored due to reduction of the tin oxide. This can occur because the tin oxide in the sintered body is reduced by impurities in the sintered body or because sputtering takes place in a non-oxidizing atmosphere.

It is desirable that a film of tin oxide be stable, both with respect to the chemical agents that it contacts in use and with respect to time. The qualities of a sputtered tin oxide film can be improved by including antimony in the tin oxide sputtering target. In particular, the conductivity and stability of the film are improved by the presence of antimony, and the transparency of the film remains acceptable.

SUMMARY OF THE INVENTION

According to a first aspect of the present invention there is provided a method of fabricating a sintered body of tin oxide, comprising forming a finely divided mixture containing at least about 0.2 weight percent ZnO, at least about 0.2 weight percent $SiO_2$, up to about 0.5 weight percent $Al_2O_3$, balance pure $SnO_2$, with the sum of the proportions of ZnO and $SiO_2$ being less than about 2 weight percent, compacting the mixture, and heating the mixture to a sintering temperature.

According to a second aspect of the present invention there is provided a method of fabricating a sintered body of antimony-doped tin oxide, comprising forming a finely divided mixture containing at least about 0.2 weight percent ZnO, at least about 0.2 weight percent $Al_2O_3$, at least about 0.2 weight percent $SiO_2$, balance antimony-doped tin oxide, with the sum of the proportions of ZnO, and $Al_2O_3$ and $SiO_2$ being less that about 6 weight percent, compacting the mixture, and heating the mixture to a sintering temperature.

Generally, an organic binding agent is added to the finely divided mixture before it is compacted so that the compacted mixture will have sufficient mechanical strength to permit it to be handled.

DETAILED DESCRIPTION

Embodiments of the invention will now be described by reference to the following examples.

Example I

A tin oxide sputtering target is fabricated from pure (at least 99.9 weight percent) tin oxide, ZnO, and $SiO_2$. A mixture comprising 0.5 weight percent ZnO, 0.5 weight percent $SiO_2$ and 99 weight percent pure tin oxide is thoroughly mixed together by ball milling. The particle size of each component of the mixture is in the range 1-20 microns. An organic binder is added to the mixture, and the mixture is spread out in a flat sheet about 50 cm by 10 cm and about 1 cm thick. The sheet is compacted by application of force along the axis perpendicular to the general plane of the sheet. This may be done using a uniaxial press. However, it is preferred that compacting be accomplished by use of an isostatic press containing a mold such that the sheet is subject to uniaxial pressure. A pressure of about 103 $MNm^{-2}$ (15,000 $lbs/inch^2$) is employed.

Alumina sand is placed on a support plate of fired alumina, and a shrink plate of green alumina is place on top of the alumina sand. Zirconia sand is placed on the shrink plate, and the compacted sheet is placed on the zirconia sand. The alumina support plate with the shrink plate and the compacted sheet on top is placed in an oven. The compacted sheet is heated in the oven in an atmosphere of air under atmospheric pressure to a temperature of about 1,600°C. at 100°C. per hour. During the heating, the organic binder is burned off. The temperature is maintained at 1,600°C. for a few hours, and the oven is then allowed to cool. In this fashion, the compacted sheet is sintered. The sintered body contains tin oxide and has a density of about 94% theoretical. The sintered body is machined to the geometry of the desired sputtering target. In particular, the surface from which tin oxide is to be sputtered is smoothed in order to avoid creation of hot spots during sputtering.

During the sintering operation, the zinc oxide and the silicon oxide combine to form zinc silicate, of which the melting point is below 1,600°C. The liquid zinc silicate acts as a sintering agent and promotes diffusion of tin oxide between grains. The presence of the zinc silicate in the sintered body does not degrade its qualities as a sputtering target.

Example II

A sintered body of pure tin oxide is white, but if the sintered body contains an impurity that acts as a reducing agent with respect to $SnO_2$, the sintered body may have a blue-grey cast. The film formed by sputtering such a sintered body is not clear, but has a slight blue-grey tint. Further, if a sintered body of pure tin oxide is sputtered in a non-oxidizing atmosphere, the resulting film may have a slight blue-grey tint.

A mixture similar to that made in Example I but containing 98.5 weight percent pure tin oxide and 0.5 weight percent aluminum oxide was prepared and was compacted and sintered in the manner described in Example I. The $Al_2O_3$ combines with the ZnO and $SiO_2$ to form aluminum silicate, zinc silicate and zinc aluminum silicate, each of which is liquid at 1600°C. and acts as a sintering agent with respect to tin oxide. The addition of aluminum oxide was found to improve the homogeneity of the sintered body and to prevent coloration of the sintered body due to reduction of the tin oxide. Since coloration of the sintered body was prevented, the film formed by sputtering the sintered body is clear. Further, even when the body is sputtered in a non-oxidizing atmosphere, a clear film is formed.

Example III

A mixture comprising one part by weight zinc oxide, one part by weight aluminum oxide, one part by weight silicon dioxide and 147 parts by weight antimony-doped tin oxide was prepared. The antimony dopant was present in the tin oxide in the form of antimony oxide, the antimony-doped tin oxide containing 30 weight percent antimony oxide and 70 weight percent tin oxide. The components of the mixture were thoroughly mixed together by ball milling. The mixture was compacted and sintered in the manner described in Example I, except that the maximum temperature achieved during the sintering operation was 1,500°C. Antimony oxide vaporizes at a temperature of about 1,550°C., and vaporization of the antimony oxide is avoided by maintaining the temperature below 1,500°C. A sintered body having a density over 90% theoretical was formed.

During the sintering operation, the aluminum oxide, the silicon oxide and the zinc oxide combine to form zinc silicate, zinc aluminum silicate and aluminum silicate, each of which is liquid at 1,500°C. and acts as a sintering agent with respect to antimony-doped tin oxide. The presence of the sintering agents in the sintered body does not prevent the sintered body from functioning as an effective sputtering target.

It will be appreciated that the present invention is not restricted to the particular embodiments that have been described, and that variations may be made therein without departing from the scope of the invention as defined in the appended claims and equivalents thereof. For example, use of a binding agent is not essential, since the compacted body may be fired without removing it from its compaction mold, provided that the mold is made of a material that is able to withstand the firing temperature and is inert with respect to the ingredients of the compacted mixture. The conditions under which sintering takes place are not critical. Atmosphere has virtually no effect on the sintering operation, so long as the atmosphere is not strongly reducing. It is usual to heat the compacted body to its sintering temperature at about 100°C. per hour, but this rate of heating is not critical. The compacted body is maintained at the sintering temperature for a time that is typically from one hour to ten hours but is not critical. Whether sintering has taken place is readily determined by examination of the body after it has cooled.

The invention is not restricted to the various components of the compacted mixture being present in the proportions mentioned above. For example, in the case of Examples I and II the proportions of zinc oxide, silicon dioxide and aluminum oxide may each be reduced as low as 0.2 weight percent, with the proportion of tin oxide being increased accordingly, and in Example III the proportion of antimony oxide may be reduced. In the case of Example I, the sum of the proportions of $SiO_2$ and ZnO is less than about 2 weight percent. In Example III, zinc oxide, aluminum oxide and silicon dioxide can each be present in an amount up to about 2 weight percent, although it is preferred that the sum of the proportions of zinc oxide, aluminum oxide and silicon dioxide be less than 2 weight percent. It has been found that the greater the proportion of antimony oxide, the greater is the amount of aluminum oxide required.

I claim:

1. A method of fabricating a sintered body of tin oxide, comprising:
   (a) forming a finely divided mixture containing at least about 0.2 weight percent ZnO, at least about 0.2 weight percent $SiO_2$, up to about 0.5 weight percent $Al_2O_3$, balance pure $SnO_2$, with the sum of the proportions of ZnO and $SiO_2$ being less than about 2 weight percent,
   (b) compacting the mixture, and
   (c) heating the mixture to a sintering temperature.

2. A method according to claim 1, wherein the mixture formed in step (a) contains less than about 0.5 weight percent ZnO and less than about 0.5 weight percent $SiO_2$.

3. A method according to claim 1, wherein the temperature to which the mixture is heated in step (c) is about 1600°C.

4. An article of manufacture comprising a sintered body made by a method that comprises forming a finely divided mixture containing at least about 0.2 weight percent ZnO, at least about 0.2 weight percent $SiO_2$, up to about 0.5 weight percent $Al_2O_3$, balance pure $SnO_2$, with the sum of the proportions of ZnO and $SiO_2$ being less than about 2 weight percent, compacting the mixture, and heating the mixture to a sintering temperature.

5. A method of fabricating a sintered body of antimony-doped tin oxide, comprising:
   (a) forming a finely divided mixture containing at least about 0.2 weight percent ZnO, at least about 0.2 weight percent $Al_2O_3$, at least about 0.2 weight percent $SiO_2$, balance antimony-doped tin oxide, with the sum of the proportions of ZnO, and $Al_2O_3$ and $SiO_2$ being less that about 6 weight percent,
   (b) compacting the mixture, and
   (c) heating the mixture to a sintering temperature.

6. A method according to claim 5, wherein the mixture formed in step (a) contains up to about 2 weight percent ZnO, up to about 2 weight percent $SiO_2$ and up to about 2 weight percent $Al_2O_3$.

7. A method according to claim 6, wherein the antimony-doped tin oxide in the mixture formed in step (a) comprises up to 30 weight percent $Sb_2O_3$.

8. A method according to claim 5, wherein the temperature to which the mixture is heated in step (c) is about 1,500°C.

9. An article of manufacture comprising a sintered body made by a method that comprises forming a finely divided mixture containing at least about 0.2 weight percent $Al_2O_3$, at least about 0.2 weight percent $SiO_2$, balance antimony-doped tin oxide, with the sum of the proportions of ZnO, and $Al_2O_3$ and $SiO_2$ being less than about 6 weight percent, compacting the mixture, and heating the mixture to a sintering temperature.

* * * * *